INVENTORS
C.R. FEGLEY
R.W. INGHAM

BY D. Schuy
ATTORNEY

Jan. 30, 1968    C. R. FEGLEY ETAL    3,365,781
APPARATUS FOR INSERTING AN ARTICLE INTO
AN ARTICLE RECEIVING APERTURE

Filed Sept. 2, 1965    6 Sheets-Sheet 4

United States Patent Office 3,365,781
Patented Jan. 30, 1968

3,365,781
APPARATUS FOR INSERTING AN ARTICLE INTO AN ARTICLE RECEIVING APERTURE
Charles R. Fegley, Laureldale, and Russell W. Ingham, Wyomissing, Pa., assignors to Western Electric Company, Incorporated, New York, N.Y., a corporation of New York
Filed Sept. 2, 1965, Ser. No. 484,638
12 Claims. (Cl. 29—203)

ABSTRACT OF THE DISCLOSURE

A vibratory track successively feeds transistor cans into position atop a first vertically reciprocable pin which extends up through one of a series of can-receiving apertures in a workholder. A second vertically reciprocable pin descends to clamp the can against the first pin and then the two pins are lowered together to insert the can into the aperture. After insertion, the second pin is raised, while the first pin is lowered and horizontally shifted and inserted into the adjacent empty aperture. The first pin is indexed horizontally to advance the workholder to position the next succeeding aperture to receive another can from the vibratory track.

---

This invention relates generally to apparatus for inserting articles into apertures in a work holder and, more particularly, to apparatus for loading a plurality of transistor cans into a pallet having a row of apertures. Accordingly, the general objects of the invention are to provide new and improved apparatus of such character.

In the manufacture of certain transistors, it is necessary that the active element of the transistor, which is mounted on a header, be enclosed within a metallic can to hermetically seal the transistor. It is convenient in the handling operations to load the cans into a pallet having rows of apertures. The cans have a hollow cylindrical body, a closed end and an open flanged end. The cans are normally fed in rows along parallel vibratory tracks flange-end up, and it is desired to remove the leading can from each row and insert those cans into a row of apertures in the pallet. It has been found that with conventional handling equipment, the cans often assume canted positions and become jammed during the transfer operation. It also has been found that during removal of the leading cans the flanges of the leading cans frequently overlap with the next succeeding cans. This makes separation difficult, and has resulted in deformed flanges in some circumstances.

Another object of this invention is to provide new and improved apparatus for removing the leading can from a row of cans and for moving the can into an aligned aperture while preventing the can from assuming a canted position.

It is a further object of the invention to provide a transfer apparatus which removes the leading can from a row of flanged cans, while holding back the remainder of the cans in the row to prevent the flanges on the cans from assuming an overlapping relationship.

With these and other objects in mind, an apparatus in accordance with the invention includes facilities for inserting an article into a work holder having an aperture. A first vertically reciprocable pin extends through the aperture from beneath the work holder to support an article in alignment above the aperture. A second vertically reciprocable pin is mounted in vertical alignment with the first pin above the article for movement into coacting relationship with the article and the first pin. The pins are then moved downwardly for conjointly inserting the aligned article into the aperture.

Preferably, the first pin is also mounted for lateral movement in order to index the work holder. In such case, after an article is loaded, the first pin moves laterally to a position beneath the next aperture of the work holder to be loaded. The pin is moved into the aperture and then returned to its lateral position wherein the two pins and the to-be-loaded aperture are vertically aligned. Also, a third pin, which is actuated by the driving facilities for the second pin, is provided to retain succeeding articles in a nonobstructing position.

Other objects, advantages and aspects of the invention will become apparent by reference to the following detailed description and drawings of a specific embodiment thereof, wherein.

General arrangement

In FIGS. 1–6, there are shown in sequence the operations which are performed during one cycle for loading a single can 10 into a pallet 11 having a row of can-receiving apertures 12—12. It is to be understood that in the complete apparatus shown in FIGS. 7–10, the leading cans from six rows are loaded simultaneously into six apertures 12—12.

Figure 1:
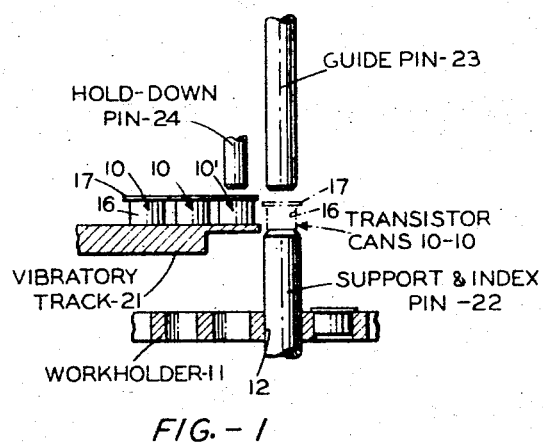
FIGS. 1–6 are fragmentary, diagrammatic views of an apparatus embodying the principles of the invention, showing the sequence of steps for inserting a transistor can into a work holder while retaining successive cans.

In FIG. 1, there is shown a row of the cans 10—10 which have hollow bodies 16—16 and flanges 17—17. The cans 10—10 are fed toward the right (FIGS. 1–6) by a conventional vibratory track 21. A vertically and horizontally movable support pin 22 is initially positioned at the end of the vibratory track 21 at the same level as the track, so that the leading can 10 is fed from the track 21 and rests on the pin 22. At this time a vertically movable guide pin 23 is vertically aligned above the support pin 22 and the leading can 10; and a vertically and horizontally movable hold-down pin 24 is vertically aligned above the next can 10' in the row.

At the start of the inserting operation (FIG. 2), the guide pin 23 moves downward into the hollow body of the leading can 10, while the hold-down pin 24 moves downward and enters the hollow body of the next can 10'.

Figure 3:
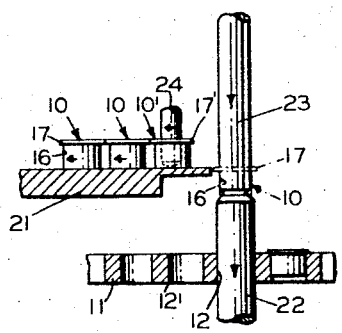

In FIG. 3, the hold-down pin 24 is moved to the left to assure that the can 10' is not in an overlapping position with the leading can 10. This insures that the flange 17' of the can 10' is not damaged by the downward movement of the guide pin 23. At this time, the guide pin 23 has fully entered the body of the leading can 10 and the pins 22 and 23 are moving downwardly in unison. This joint action of the pins 22 and 23 insures that the leading can 10 maintains a perfectly vertical orientation and does not become canted. This also insures that the can 10 is completely inserted into the aperture 12 and that the sides of the can 10 are not damaged during such an insertion. Furthermore, if the can 10 is surrounded by a cylindrical chute during the transfer operation as is customary, the can does not become jammed in the chute because of its canted orientation.

Figure 4:
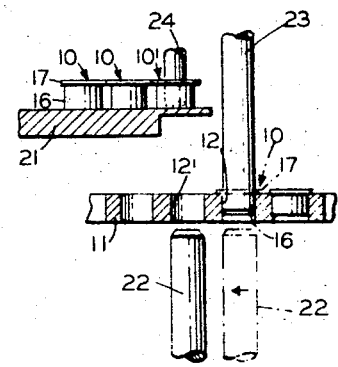
Figure 2:
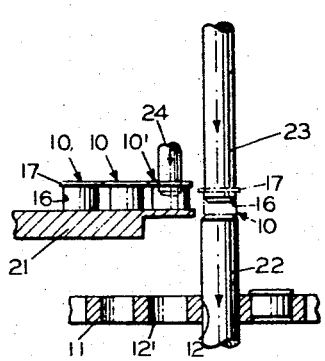

In FIG. 4, the support pin 22 and the guide pin 23 have fully inserted the can 10 into the aperture 12 and the guide pin 23 is at its lowermost position. The support pin 22 moves downwardly a sufficient distance to provide a clearance between it and the pallet 11 (shown in phantom lines) and then moves laterally to the left into axial alignment with the next aperture 12'.

Figure 5:
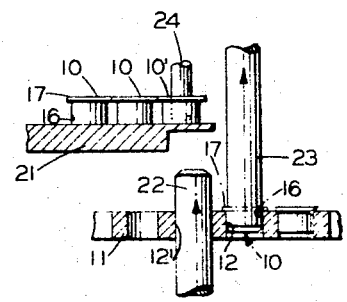

In FIG. 5, the support pin 22 is moved vertically upward into the aperture 12' in preparation for indexing the pallet 11 to the right. The guide pin 23 is just commencing upward movement in preparation for the next cycle. The hold-down pin 24 is still retaining the can 10' in its retracted position.

Figure 6:
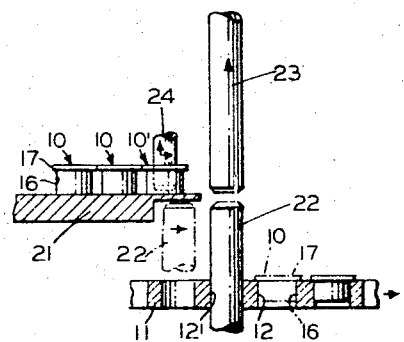

In FIG. 6, the support pin 22 reaches its position shown in phantom lines under the vibratory tarck 21 and then moves laterally to the right to index the pallet 11 and align the succeeding aperture 12' with the guide pin 23. The support pin 22 is now in position to receive the next succeeding can 10' from the vibratory track 21. The guide pin 23 is still moving upwardly and the hold-down pin 24 is moving upwardly and to the right to allow feeding of the next successive can 10' onto the support pin 22. After the pins 23 and 24 reach their positions shown in FIG. 1, the vibratory track 21 is actuated to feed the can 10' onto the support pin 22 and the cycle is repeated.

*Support and indexing pins 22—22*

In FIGS. 7-10 a plurality (six) of support and indexing pins 22—22 are provided for supporting an equal number of cans 10—10 as they are transferred from the vibratory tracks 21—21 into a row of apertures 12—12 in the pallet 11. The pins 22—22 also serve to index the pallet 11 along a pair of guide rails 26—26 (FIG. 7) after a row of apertures 12—12 is filled so as to present the next empty row of apertures. The pins 22—22 are mounted on a T-shaped support 31 which is movable in both vertical and horizontal directions.

The mechanism for moving the pins 22—22 vertically includes a link 32 (FIGS. 7 and 8) which is connected to the base of the T-shaped support 31. The link 32 is connected to a lever 33 which is pivotable about a pin 34 by a rod 36. A follower roller 37 is connected to the bottom of the rod 36 for conveying pivotable motion to the lever 33 in accordance with a cam 38 mounted on a cam shaft 39.

Figure 7:
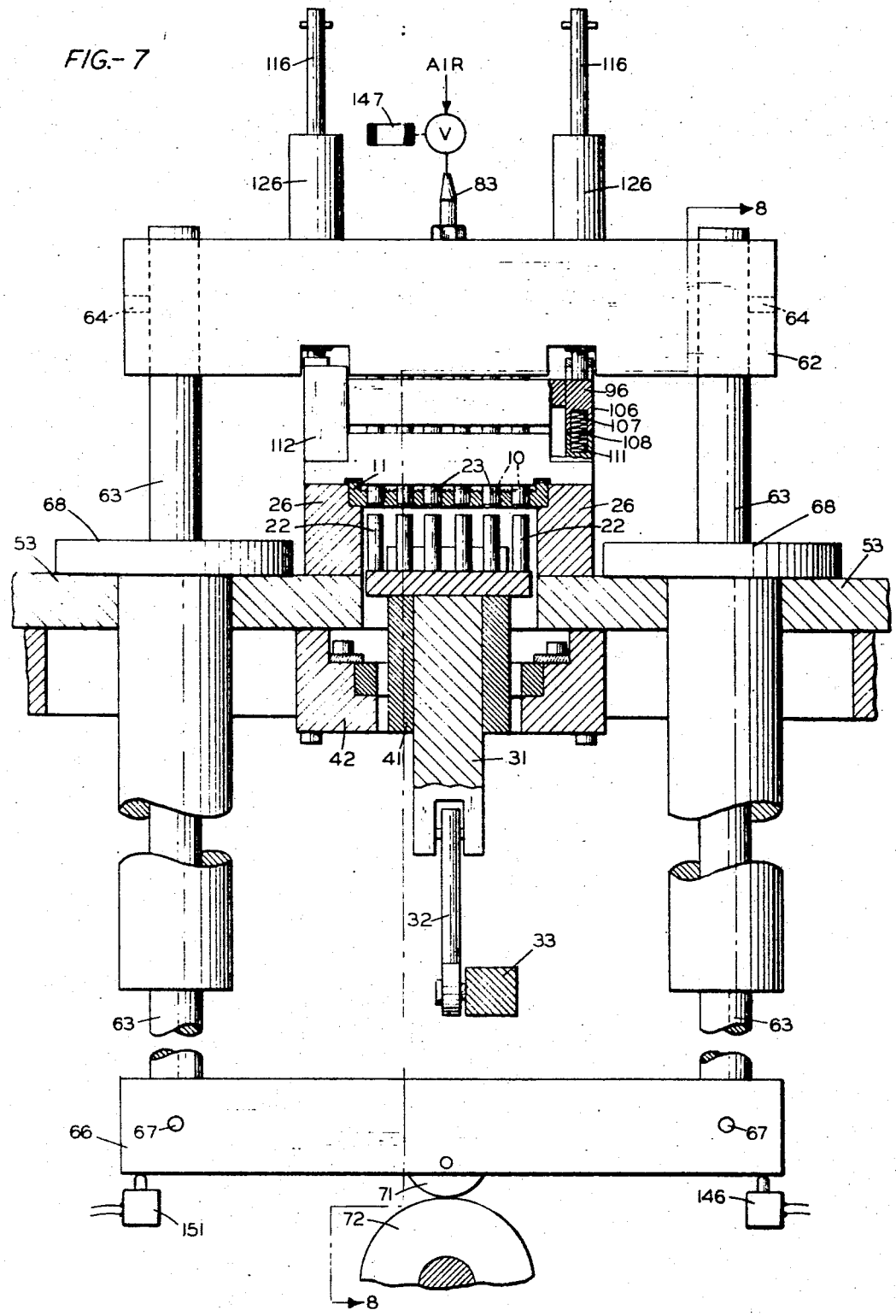
FIG. 7 is a front elevation view with portions removed, showing the apparatus in its position immediately after loading a plurality of piece parts into the work holder.
Figure 8:
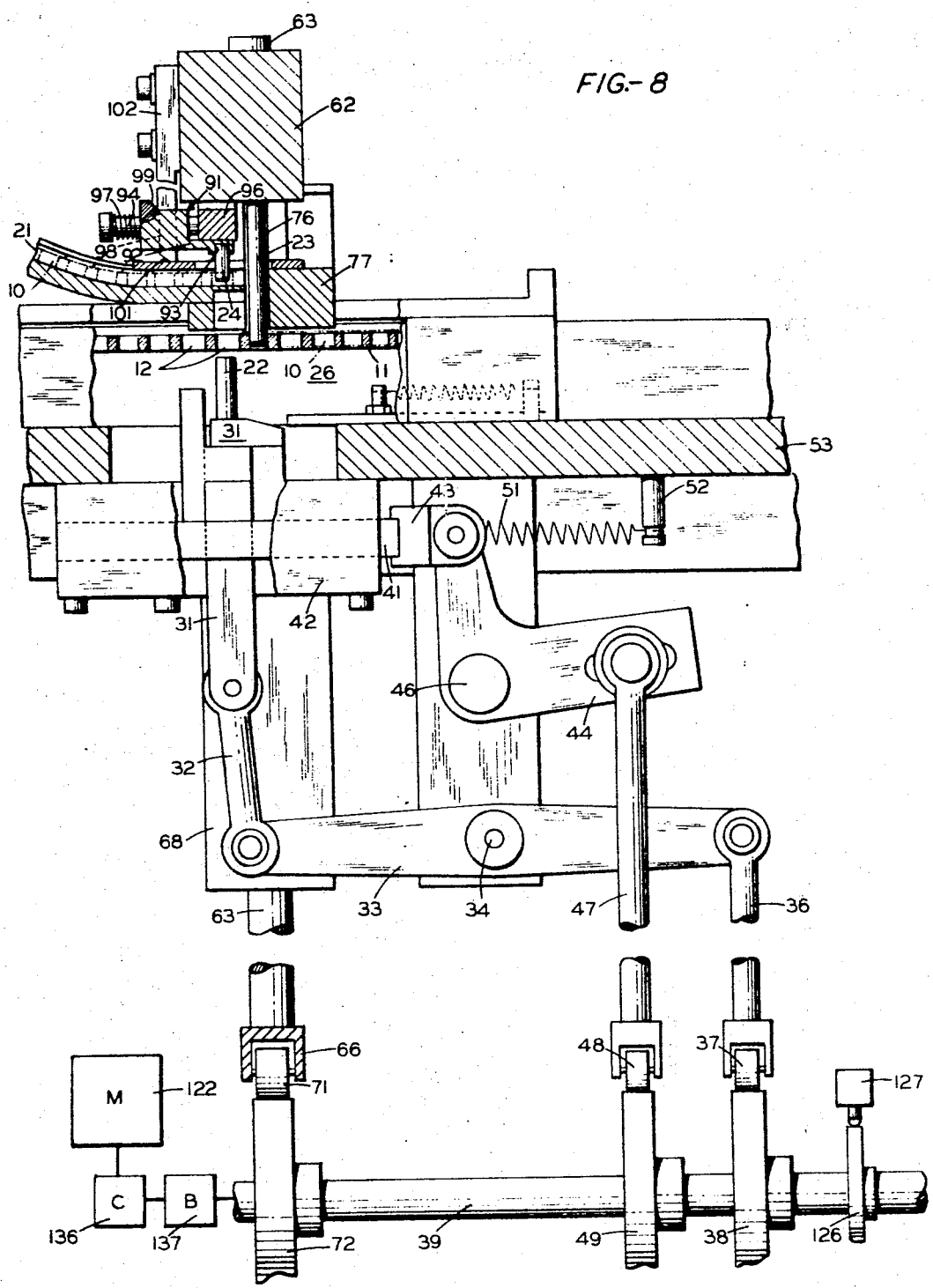
FIG. 8 is a cross-sectional view taken along the line 8—8 of FIG. 7, and particularly showing the mechanism for driving the various component parts of the apparatus.

Horizontal movement is applied to the T-shaped support 31 by a slide 41 (FIGS. 7 and 8) which is reciprocable in a housing 42 by a link 43. The link 43 is connected to a bell crank 44 which is oscillated about a pin 46 by a rod 47. A follower roller 48 is connected to the bottom of the rod 47 for applying oscillatory movement to the bell crank 44 in accordance with a cam 49 mounted on the shaft 39. A tension spring 51 is mounted between the link 43 and a pin 52 which depends from a frame 53, for normally urging the slide 41 to the right (FIG. 8). The cam 49 is effective to oscillate the bell crank 44 to drive the slide 41, the T-shape support 31 and the pins 22—22 toward the left (FIG. 8) against the urging of the spring 51 in preparation for indexing the pallet 11. On return to the right, the pins 22—22 are in the apertures 12—12 to index the entire pallet 11 to the right. The T-shaped support 31 moves freely in a vertical direction through the slide 41 so that vertical and horizontal movement may be applied separately to the pins 22—22 by the cams 38 and 49, respectively.

*Guide pins 23—23*

A plurality (six) of guide pins 23—23 (FIGS. 7-10) is provided for coacting with the pins 22—22 to move the cans 10—10 vertically downward into the apertures 12—12 of the pallet 11. The upper ends of the guide pins 23—23 are received in apertures 61—61 (FIG. 10) in an upper carriage 62. The carriage 62 is secured to a pair of drive shafts 63—63 (FIG. 7) by a pair of set screws 64—64. The drive shafts 63—63 are secured at their other ends to a lower carriage 66 by set screws 67—67; and the shafts 63—63 are guided for vertical reciprocation in a pair of bearings 68—68 which are received in the frame 53. The lower carriage 66 is provided with a follower roller 71 which is in engagement with a cam 72 for conveying vertical reciprocation to the shafts 63—63, the upper carriage 62 and the guide pins 23—23.

The guide pins 23—23 are aligned with six vertical passageways 76—76 (FIGS. 8 and 10) in the end of the vibratory tracks 21—21. A stop 77 which is integral with the tracks 21—21 acts to bring the leading cans 10—10 to a rest position over the support pins 22—22 so that the cans 10—10 are vertically aligned with the guide pins 23—23.

The guide pins 23—23 are provided with longitudinal passageways 81 (only one shown, FIG. 10) through which air is passed to insure that the cans 10—10 are separated from the guide pins 23—23 after the cans have been inserted into the apertures 12—12. Air is communicated to the apertures 81 by a manifold 82 which is connected to a tube 83 having an external source of pressurized air.

*Hold-down pins 24—24*

Figure 9:
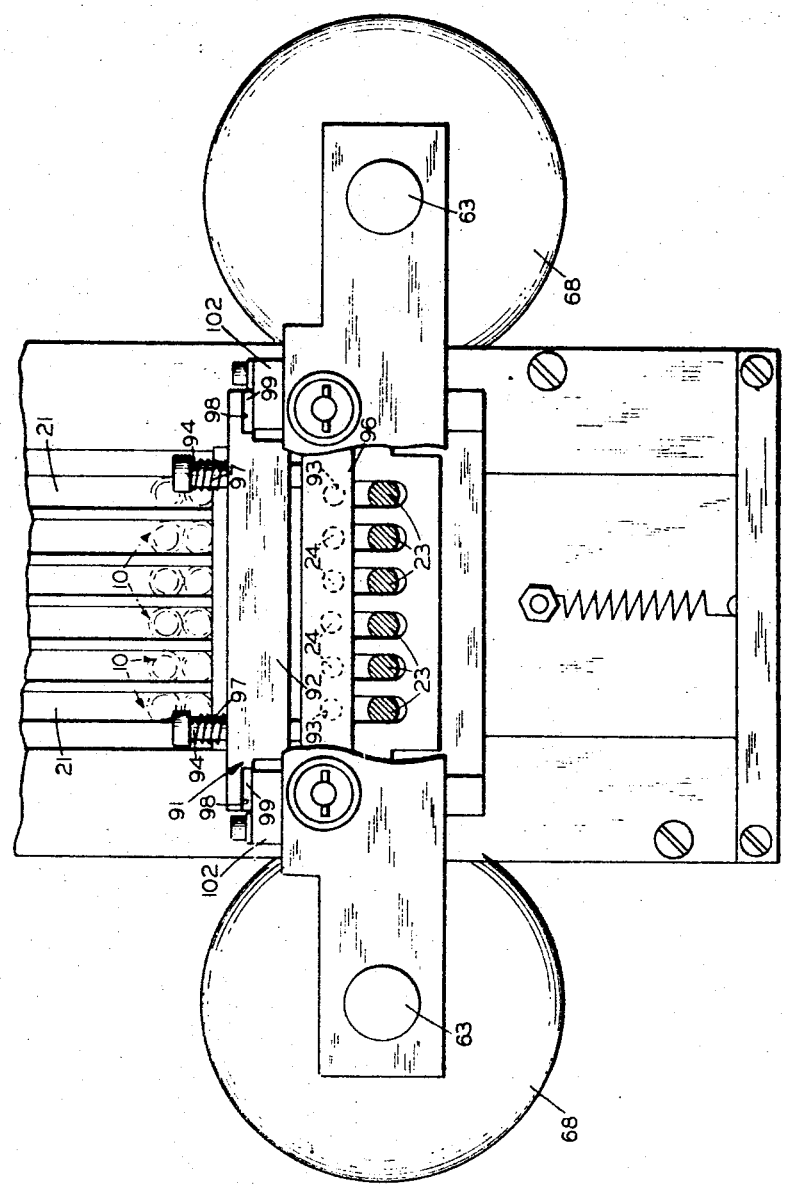
FIG. 9 is a top view of the apparatus, with portions removed, showing the mechanism for retaining those piece parts which are to be loaded in subsequent cycles of operation.

As illustrated in FIGS. 8 and 9, a plurality (six) of hold-down pins 24—24 are provided for maintaining the cans 10'—10' succeeding the leading cans in the retracted position. The hold-down pins 24—24 are mounted in a support designated generally by the numeral 91. The support 91 has a body portion 92 having apertures 93—93 (FIG. 9) in which the hold-down pins 24—24 are secured. The body portion 92 is slidably mounted on a pair of horizontal guide rods 94—94 which are secured at one end to a block 96. A compression spring 97 (FIG. 9) is mounted on each guide rod 94 to urge the body portion 92 and the pins 24—24 to the right (FIG. 8). The body portion 92 also has openings 98—98, one on each side, at the top of which are beveled surfaces 99—99 (FIG. 9). The openings 98—98 are vertically aligned with camming surfaces 101 (only one shown, FIG. 8) of cams 102—102. The cams 102—102 are bolted to the upper carriage 62 and act to cam the hold-down pins 24—24 and the succeeding cans into a retracted position to the left (FIG. 8) as the upper carriage 62 moves downwardly.

The block 96 (FIG. 8) rests on the body portion 92 of the support 91; therefore, downward movement of the block 96 is conveyed to the hold-down pins 24—24 for positioning the pins in the succeeding cans 10'—10'. The block 96 has end portions 106—106 (FIGS. 7 and 10) which have apertures 107—107 for receiving compression springs 108—108. The other end of the compression springs 108—108 are received in apertures 111—111 of an upstanding guide 112—112. The end portions 106—106 are free to ride in slots 113—113 (FIG. 10) in the guides 112—112 under the urging of a pair of rods 116—116 which are in engagement with the upper surface of the block 96 during the downward movement of the carriage 62.

It is desired that the rods 116—116 move the block 96 and the hold-down pins 24—24 downwardly during the initial downward movement of the upper carriage 62. This allows the hold-down pins 24—24 to enter the next succeeding row of cans 10'—10'. The hold-down pins 24—24 are then moved laterally away from the guide pins 23—23 by the cams 102—102 to insure that none of the cans are in an overlapping relationship. Downward movement of the upper carriage 62 is conveyed to the rods 116—116 (FIG. 10) by a pair of compression springs 121—121 which are received in apertures 122—122 in the upper carriage 62. The springs 121—121 act against a pair of washers 123—123 which transmit a downward force through a pair of pins 124—124 to the rods 116—116. The rods 116—116 are guided for vertical reciprocation by a pair of bearings 126—126 (FIG. 7).

As the upper carriage 62 moves downwardly (FIG. 10), the springs 121—121 are somewhat compressed and the block 96 is moved down by the rods 116—116. This movement also compresses the springs 108—108. When the end portions 106—106 of the block 96 become flush with the guides 112—112 (FIG. 7), no further movement of the hold-down pins 24—24 is permitted. At this time the pins 24—24 are securely seated in the cans 10'—10'. As the downward movement of the carriage 62 continues, the springs 121—121 are further compressed to provide the force for subsequently raising the carriage 62 and its associated equipment.

On the return upward cycle, wherein the shafts 63—63 are driving the carriage 62 upwardly, the compression on the springs 121—121 is relieved gradually. As the carriage 62 approaches its raised position, the compressive force of the springs 108—108 is sufficient to overcome the springs 121—121 to raise the block 96 and the hold-down pins 24—24. This removes the hold-down pins 24—24 from the cans 10'—10' and allows the vibratory tracks 21—21 to advance another row of cans into position under the now raised guide pins 23—23. Also, as the upper carriage 62 rises, the cams 102—102 are removed from the openings 98—98 (FIG. 8) allowing the springs 97—97 to move the body portion 92 and the hold-down pins 24—24 to the right. This positively advances the cans 10'—10' into a position immediately adjacent the support pins 22—22.

*Control circuit and detailed operation*

Figure 11:
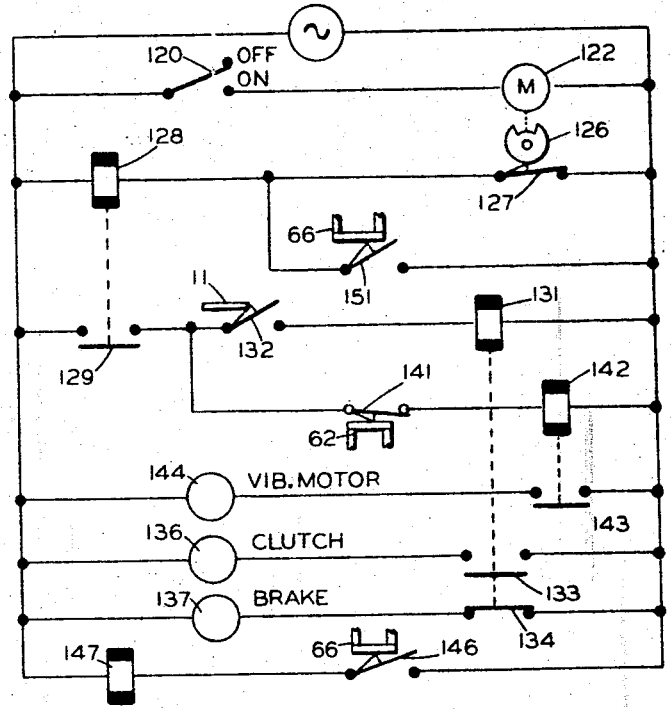
FIG. 11 is a schematic diagram illustrating control facilities for the apparatus.
Figure 12:
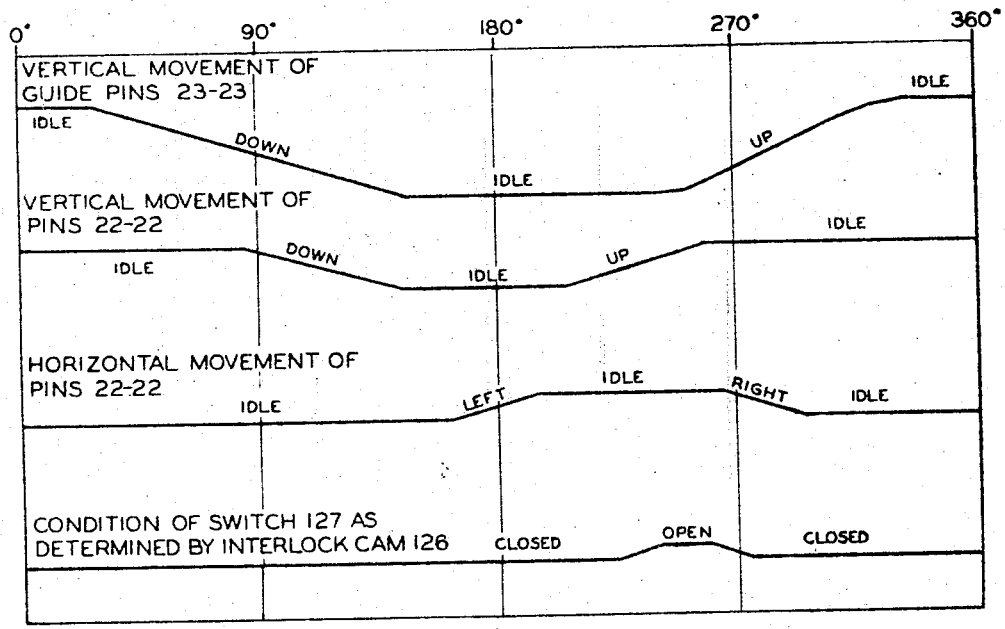
FIG. 12 is a timing chart indicating the sequence of operation of the various mechanisms included in the apparatus.

Referring to FIGS. 11 and 12, there is shown a circuit for controlling the operation of the apparatus and a timing chart indicating the synchronized movement of the various mechanisms. Initially, it is assumed that the support pins 22—22, the guide pins 23—23 and the hold-down pins 24—24 are in their uppermost positions. The vibratory tracks 21—21 have fed the leading row of cans 10—10 into a position on the support pins 22—22 and the cans 10—10 are ready for loading into the apertures 12—12.

In order to initiate cyclic operation of the apparatus, a cycle start switch 120 is closed to complete a circuit to a motor 122. The motor drives the cam shaft 39 (FIG. 8) for controlling the synchronized movements of the support pins 22—22 and the guide pins 23—23.

Figure 10:
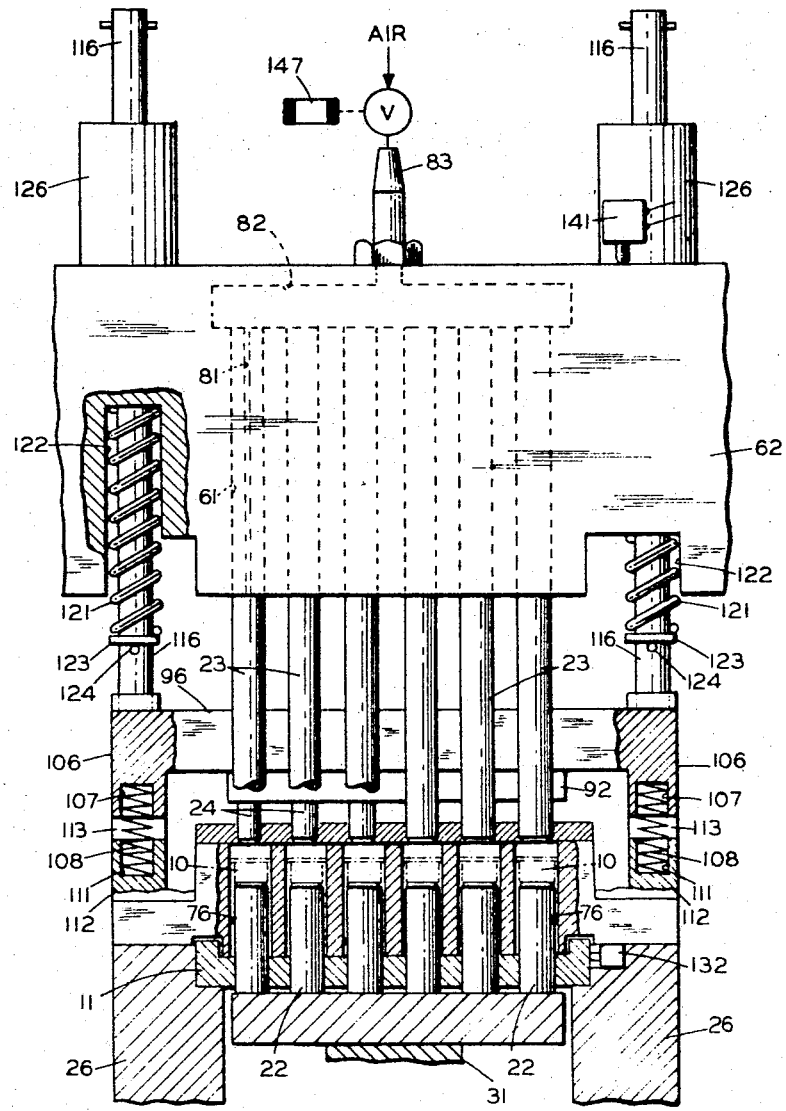
FIG. 10 is an enlarged front elevation view with portions removed, similar to a portion of FIG. 7, showing the apparatus in its upper position prior to commencement of the loading cycle.

At 0° of the cycle of operation, an interlock cam 126 maintains a switch 127 closed to complete a circuit through a relay 128. The relay 128 closes a contact 129 which completes a circuit through a relay 131 so long as there is a pallet 11 on the track to maintain a limit switch 132 closed (FIG. 10). Energization of the relay 131 closes a contact 133 and opens a contact 134 which engages a clutch 136 and disengages a brake 137, respectively (also shown in FIG. 8). With the clutch 136 engaged, the power from the motor 122 is transmitted to the cam shaft 39. Conversely, when the relay 131 is de-energized, the clutch 136 is disengaged and the brake 137 is engaged to stop the rotation of the shaft.

Also at 0° with the contact 129 closed and the upper carriage 62 in its uppermost position, a limit switch 141 is closed to complete a circuit to a relay 142. Energization of the relay 142 closes a contact 143 which completes the circuit through a vibratory motor 144 for feeding the cans 10—10 along the tracks 21—21.

At approximately 25° of the cycle, the cam 72 is positioned such that the guide pins 23—23 commences downward movement into the cans 10—10. Simultaneously, the hold-down pins 24—24 are moved downwardly under the influence of the rods 116—116 to move the hold-down pins 24—24 into the next succeeding cans 10'—10'. After the hold-down pins 24—24 are partially inserted, the cams 102—102 engage the beveled surfaces 99—99 on the support 91 to move the hold-down pins 24—24 to the left (FIG. 8) away from the guide pins 23—23. When the end portions 106—106 (FIG. 10) of the block 96 become flush with the guides 112—112, downward movement of the hold-down pins 24—24 is terminated. At this time the succeeding cans 10'—10' are firmly held in a nonobstructing position by the hold-down pins 24—24. Also, as the upper carriage 62 moves down, the limit switch 141 is opened to de-energize the vibratory motor 144.

At approximately 85° of the cycle, the guide pins 23—23 have entered fully into the cans 10—10 and downward movement of the support pins 22—22 is commenced. For approximately the next 65° of the cycle, the support pins 22—22 and the guide pins 23—23 move in unison downwardly until the cans 10—10 are inserted into the apertures 12—12. During this period the cans 10—10 are maintained in a vertical, aligned manner which prevents the flanges 17—17 from becoming jammed in the passageways 76—76 (FIG. 10). Similarly, it assures that the cans 10—10 enter the apertures 12—12 with the proper alignment.

At approximately 140° of the cycle, the guide pins 23—23 stop their downward movement and the support pins 22—22 continue their downward movement for a short distance allowing the pins 22—22 to withdraw entirely from the pallet 11. With the lower carriage 66 in its down position, a limit switch 146 is closed. This completes a circuit to a solenoid operated valve 157 (FIG. 10) which controls the application of air to the manifold 82. This passes air through the passageways 81 (only one shown) to separate the cans 10—10 from the guide pins 23—23.

At approximately 165° of the cycle, the pins 22—22 commence movement to the left (FIG. 7) by the cam 49 in preparation for indexing the pallet 11 to present the next row of empty apertures 12'—12'. As this is happening, the pins 22—22 have no vertical motion and the guide pins 23—23 are stationary.

At approximately 195° of the cycle, the pins 22—22 are positioned beneath the apertures 12'—12' and cease their lateral movement to the left.

At approximately 205° of the cycle, the pins 22—22 are moved upward by the cam 38 through the apertures 12'—12'.

At 225° of the cycle, a check is made to insure that the lower carriage 66 is in its fully down position. This is accomplished by the interlock cam 126 which opens the switch 127. If at this time, the lower carriage 66 has not closed a limit switch 151, the relay 128 is de-energized. This, in turn, de-energizes the relay 131 which disengages the clutch 136 and engages the brake 137 to stop the operation of the apparatus. If the lower carriage 66 is fully down, the operation is continued uninterrupted. At 260°, the check is completed and the interlock cam 126 closes the switch 127 in preparation for the upward movement of the carriage 62.

At approximately 240° of the cycle, as the pins 22—22 are still moving upwardly, the upward movement of the guide pins 23—23 is commenced by the cam 72. This raises the lower carriage 66, opens the limit switch 146, and terminates the supply of compressed air to the passageways 81.

At 225° of the cycle, the pins 22—22 are in a position beneath the vibratory tracks 21—21 (shown in phantom lines in FIG. 6) and are ready for indexing the pallet 11. At approximately 265° of the cycle, the guide pins 23—23 are nearly withdrawn from the passageways 76—76 and the pins 22—22 are moved to the right to align the apertures 12'—12' of the pallet 11 beneath the guide pins 23—23. This indexing of the pallet 11 is stopped at approximately 295°.

At approximately 330° of the cycle, the guide pins 23—23 reach their uppermost position and are ready for the next cycle of operation. Shortly before this, the cams 102—102 withdraw from the openings 98—98 allowing the support 91 and hold-down pins 24—24 to be moved to the right (FIG. 7) by the springs 97—97. This feeds the cans 10'—10' into a position immediately adjacent the support pins 22—22. Also, as the carriage 62 rises the springs 108—108 overcome the springs 121—121 to raise the block 96 and the hold-down pins 24—24 out of the cans 10'—10'.

At approximately 360° of the cycle, the guide pins 23—23 reach their uppermost position and the carriage 62 again closes the limit switch 141 which energizes the relay 142. This closes the contact 142 and energizes the vibratory motor 144 to vibrate the tracks 21—21.

The apparatus is now in position to repeat the cycle and does so unless there is an interruption, such as the absence of a pallet 11 or the opening of the start switch 120.

It is to be understood that the above-described arrangement of apparatus and construction of elemental parts are simply illustrative of an application of the principles of the invention, and that many other modifications may be made without departing from the invention.

What is claimed is:

1. Apparatus for inserting an article into a receiving aperture in a work holder, which comprises:
    a first vertically reciprocable pin extending through the aperture from beneath the work holder, for supporting the article on the first pin above the work holder in alignment with the aperture;
    a second vertically reciprocable pin mounted in vertical alignment with the first pin above the article on the first pin;
    means for moving the first pin downwardly through the aperture in the work holder; and
    means for moving the second pin down into engagement with the article on the first pin just prior to the downward movement of the first pin to position the article between the pins, and then moving the second pin downwardly conjointly with the first pin to insert the article into the aperture.

2. Apparatus for inserting successive hollow articles into a work holder having a row of apertures, which comprises:
    means for supplying successive articles to a work station;
    a first vertically reciprocable pin extending through the aperture to be loaded for supporting an article in alignment above the aperture at the work station;
    a second vertically reciprocable pin aligned above the hollow article;
    means for moving the first pin downwardly through the aperture in the work holder; and
    means for moving the second pin into the hollow article just prior to the downward movement of the first pin to align the article, and then moving the second pin conjointly witht he first to insert the aligned article into the aperture.

3. Apparatus as recited in claim 2 further including:
    means for returning the second pin to a position above the work station; and
    means for moving the first pin in the following manner after each successive loading operation:
        (a) laterally backward to a position beneath the next aperture of the work holder to be loaded;
        (b) upwardly through the aperture to the height of the work station for receiving the next article; and
        (c) laterally forward to index the work holder and align the aperture and the first pin with the second pin.

4. Apparatus as recited in claim 2, further including:
    a third pin operated by the second pin moving means for movement into the article immediately succeeding the article to be loaded to maintain the succeeding articles in nonobstructing position at the work station.

5. Apparatus as recited in claim 4, which comprises:
    a carriage for supporting the second pin for vertical reciprocation;
    a slidable support positioned beneath the carriage for holding the third pin, said support having a camming surface;
    a cam depending from the carriage and aligned with the camming surface so that on downward movement of the carriage the carriage engages the support and moves the third pin into the immediately succeeding article and then the cam moves the support with the third pin and the article to the nonobstructing position.

6. Apparatus for loading successive articles into apertures in a work holder, which comprises:
    means for feeding successive articles to a work station;
    a first pin mounted beneath the work station, said pin being mounted for horizontal and vertical reciprocation;
    a second pin mounted above the work station and axially aligned with the first pin;
    means for moving the first pin upwardly through the aperture to be loaded, then horizontally to align the aperture with the work station and to support the article from the bottom, and then downwardly to lower the article;
    means for moving the second pin downwardly into coacting relationship with the article and the first pin prior to the downward movement of the first pin to maintain the alignment of the article and then moving the second pin conjointly with the first pin to lower the article into the aperture; and
    means for returning the second pin to its initial position above the work station.

7. Apparatus as recited in claim 6, further including:
    a third pin; and
    means for operating the third pin in unison with the second pin to engage and clamp the article immediately succeeding the article to be loaded in a nonobstructing position.

8. Apparatus as recited in claim 7, wherein:
    the second pin moving means operates to move the third pin downwardly in unison with the second pin a sufficient distance to clamp the immediately succeeding article; and wherein
    a cam is provided for moving the clamped succeeding article laterally into the nonobstructing position.

9. Apparatus as recited in claim 8, further including:
    resilient means which is compressed by the lateral movement of the third pin for returning the third pin and the clamped succeeding article to a position adjacent the work station as the second pin is returned to its initial raised position.

10. Apparatus as recited in claim 9, wherein said feeding means is actuated when the second pin reaches its raised postion, and the second pin has an axial passageway extending therethrough, and wherein said apparatus further includes:
    means for passing air through the passageway to force the article away from the second pin and into the aperture;
    means for stopping the operation of the apparatus if there is no work holder present for loading; and
    means for stopping the operation of the apparatus if the second pin does not reach a predetermined lower point at which the article is fully inserted into the aperture.

11. Apparatus for inserting an article into a receiving aperture in a receptacle, which comprises:
- a first pin extending through the aperture from a first side of the receptacle, for engaging an article on a second side of the receptacle and aligning the article with the aperture;
- means for mounting said first pin for reciprocation;
- a second pin mounted in alignment with said first pin and spaced from the end of said first pin;
- means for mounting said second pin for reciprocation;
- means for moving said second pin toward said first pin to bring the end of said first pin into engagement with the article to clamp the article between the pins; and
- means rendered effective upon clamping the article for moving said first and second pins conjointly toward said receptacle to insert the article into the aperture.

12. Apparatus for successively inserting articles into apertures in a workholder, which comprises:
- a first pin extending up through a first aperture in the workholder;
- means for mounting said first pin for vertical reciprocation and horizontal shifting;
- a second pin above the work holder in alignment with said first pin;
- means for mounting said second pin for vertical reciprocation;
- a third pin above the work holder adjacent said second pin;
- means for mounting said third pin for vertical reciprocation and horizontal shifting;
- means for feeding an article from a supply of articles onto the end of said first pin to be supported above and in alignment with said first aperture;
- means for moving said second pin down and then back up;
- means rendered effective as said second pin is moving down for vertically moving said third pin down into contact with the article nearest said second pin and for horizontally moving said third pin to shift all of said linearly arranged articles away from said second pin to insure that said second pin is lowered without contacting an edge of a stored article;
- means rendered effective when said second pin is moved down to contact the article supported by said first pin for moving said first pin conjointly downwardly to insert the article into said first aperture and withdraw said second pin from said aperture;
- means rendered effective upon said second pin being withdrawn from said first aperture for horizontally shifting said first pin into alignment with a second aperture adjacent said first aperture and then raising said pin to insert it into said second aperture;
- means rendered effective when said first pin is inserted through said second aperture and said second pin is fully raised for horizontally shifting said first pin into alignment with said second pin to shift the work holder and move said second aperture into alignment with said second pin; and
- means rendered effective when said first and second pins are aligned with said second aperture for horizontally shifting said third pin toward said second pin and raising said third pin, to allow the next article in said linear arrangement to be fed onto the end of said first pin.

References Cited

UNITED STATES PATENTS

| | | | |
|---|---|---|---|
| 2,604,692 | 7/1952 | Broden | 29—208 |
| 2,693,924 | 7/1954 | Schryver | 29—203 |
| 2,768,763 | 10/1956 | Meilstrup | 29—211 |
| 2,795,842 | 6/1957 | Van Nest et al. | 29—211 |
| 2,878,556 | 3/1959 | Heidergott et al. | 29—211 |
| 2,882,553 | 9/1957 | Cahill | 18—5 |
| 3,037,269 | 6/1962 | Barkstrom et al. | 29—203 |
| 3,101,868 | 8/1963 | Glanke | 221—225 |
| 3,116,543 | 1/1964 | Schoos | 29—201 |

THOMAS H. EAGER, *Primary Examiner.*